Sept. 23, 1969  G. M. CROOK  3,468,191
GEAR TRAIN

Filed Aug. 17, 1967  4 Sheets-Sheet 1

INVENTOR
GAINES MORTON CROOK

Sept. 23, 1969   G. M. CROOK   3,468,191
GEAR TRAIN
Filed Aug. 17, 1967   4 Sheets-Sheet 2
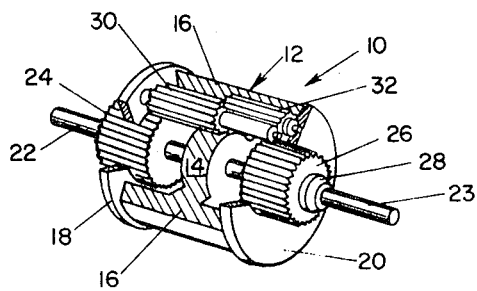
FIG.2
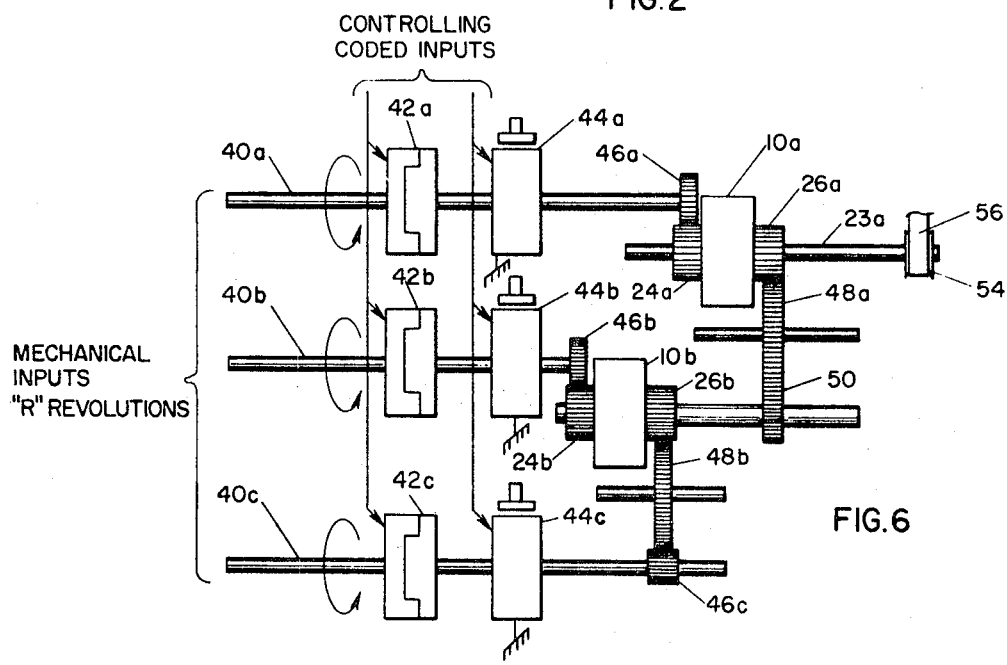
FIG.6
FIG.5
| BINARY NUMBER | INPUT SHAFT CONDITION | | | OUTPUT REVOLUTIONS |
|---|---|---|---|---|
| | 1 | 2 | 3 | |
| a. 000 | 0 | 0 | 0 | ZERO |
| b. 001 | 0 | 0 | 1 | 1/8 R |
| c. 010 | 0 | 1 | 0 | 1/4 R |
| d. 011 | 0 | 1 | 1 | 3/8 R |
| e. 100 | 1 | 0 | 0 | 1/2 R |
| f. 101 | 1 | 0 | 1 | 5/8 R |
| g. 110 | 1 | 1 | 0 | 3/4 R |
| h. 111 | 1 | 1 | 1 | 7/8 R |
SHAFTS 1, 2 & 3 ROTATE "R" TIMES
TRUTH TABLE
INVENTOR
GAINES MORTON CROOK Sept. 23, 1969   G. M. CROOK   3,468,191
GEAR TRAIN
Filed Aug. 17, 1967   4 Sheets-Sheet 3

INVENTOR
GAINES MORTON CROOK

| TRUTH TABLE | | | | |
|---|---|---|---|---|
| BINARY NUMBER | CLUTCH BRAKE NO.1 | CLUTCH BRAKE NO.2 | CLUTCH BRAKE NO.3 | OUTPUT SPEED |
| 000 | 0 | 0 | 0 | ZERO |
| 001 | 0 | 0 | 1 | 1/8 INPUT |
| 010 | 0 | 1 | 0 | 1/4 INPUT |
| 011 | 0 | 1 | 1 | 3/8 INPUT |
| 100 | 1 | 0 | 0 | 1/2 INPUT |
| 101 | 1 | 0 | 1 | 5/8 INPUT |
| 110 | 1 | 1 | 0 | 3/4 INPUT |
| 111 | 1 | 1 | 1 | 7/8 INPUT |

INVENTOR
GAINES MORTON CROOK

3,468,191
GEAR TRAIN
Gaines Morton Crook, 7568 Chaminade Ave.,
Canoga Park, Calif. 91304
Filed Aug. 17, 1967, Ser. No. 661,263
Int. Cl. F16h 37/06
U.S. Cl. 74—681                                     10 Claims

ABSTRACT OF THE DISCLOSURE

This is a gear train for producing an infinitely variable number of discrete angles, angular velocities or torques in fully controllable increments. The apparatus includes a plurality of stages having converting elements controlled by appropriate clutches and brakes to incorporate into or isolate the converting elements from operability in the system. This gear train is ideally suited for binary coding.

BACKGROUND OF THE INVENTION

Numerous variable speed drive mechanism are in use today, the Graham transmission, based upon continuous ratio change, and various sliding gear ratios being representative of the variety available. Nevertheless, each has its peculiarities and technical shortcomings. Problems such as operational roughness in stepping from one ratio to another, the inability to transmit high torques, the development of excessive friction, and general structural complication lead to design and functional difficulties in many instances.

Extreme difficulties have been encountered in attempts to design a mechanically simple gear train wherein a large number of discrete gear ratios were to be provided.

Since the advent of binary numerical control procedures for the operation of machine tools and other similarly controllable machines, the design and functional difficulties discussed have been vastly multiplied. Stringent requirements have been established for criteria such as design simplicity, maintenance-free operation and smooth operational ratio changes. For these reasons, designers have been severely limited by having an insufficient variety of appropriate gear trains from which to choose.

It is necessary for an understanding of this invention that the numerical environment within which it functions be clearly stated. Therefore, a brief general discussion of this environment is provided.

In the symbolic representation of numbers, two characteristics are used together to define a quantity. These are: (1) the radix of the system, i.e., the number of digit symbols employed, and (2) the position of the digit in the sequence of numbers. Ten digits are employed in the Arabic system, while the binary system employs only two. The position of a particular digit in a multidigit presentation of the binary system signifies the change in the quantity to be expressed which would be caused by a change in that digit. The further to the left a digit appears in a number the more "significant" it is.

A number can be considered a sum of factors, each composed of digits multiplied by the radix raised to the power signified by its position in the presentation. The Arabic number 5083 might be expressed by the sum: $5 \times 10^3 + 0 \times 10^2 + 8 \times 10^1 + 3 \times 10^0$. The binary number 11011 has a meaning of 27. This number might be expressed as $1 \times 2^4 + 1 \times 2^3 + 0 \times 2^2 + 1 \times 2^1 + 1 \times 2^0$.

If a gear train system is to be constructed in which any desired integer may be inserted, mechanical elements must be present which perform the functions of multiplying a digit by the radix raised to the correct power for each significant figure. It must contain elements capable of summing the required number of significant figures.

It is also to be noted that most prior art systems for changing shaft rotational speeds are based upon a simple multiplying factor. No presently known system employs the sum of digits multiplied by the power of a system radix. The use of a "summing" element has been limited primarily to simple applications of mechanical differentials and to the subtracting capability of these differentials, as in the "differential draw transmission."

BRIEF DESCRIPTION OF THE INVENTION

This invention makes full use of the principles of radix and position so that the number of discrete ratios available may greatly exceed the number of stages of gearing. The binary system of numbers is used throughout the explanation contained herein, except where binary coded decimal is specifically mentioned.

An object of this invention is to provide a gear train mechanism which will fulfill design requirements in the aforementioned particulars.

Yet another object is to provide a gear train wherein any one of a multitude of discrete gear ratios may be readily selected and smoothly transitioned into an operational status.

Still another object is to make available to industry a gear system which utilizes the selectable sums of several discrete ratios to vastly multiply the number of discrete ratios available in a given system.

Other objects of this invention will become readily apparent when the following specification and the appended claims are considered in light of accompanying drawings; in which:

FIGURE 2 is a cutaway perspective view of a reverse ratio simple differential usable as the converter of this invention;

FIGURE 5 is a "truth table" usable with a typical embodiment of the invention;

FIGURE 6 is a semischematic illustration of a first embodiment of the invention;

DETAILED DESCRIPTION

This invention utilizes mechanical converters which are generally analogous to the electrical element known as the binary-to-analog converter. In this element, binary coded inputs are combined to provide any desired integer in analog form.

Figure 1:
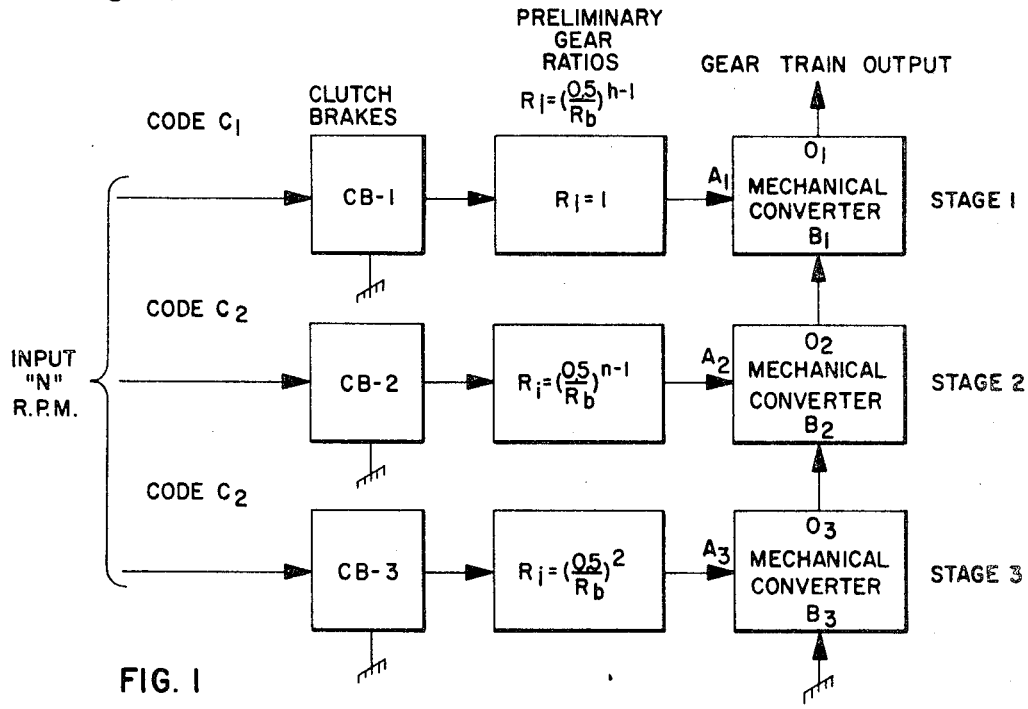
FIGURE 1 is a symbolic representation of a typical system incorporating this invention.

The required characteristics for the desired mechanical converter element, as symbolically represented in each of the right-hand blocks of FIGURE 1, include two separate inputs A and B and one output O. When the output is braked and either input is rotated, the other input rotates in the opposite direction. If both inputs are rotated in the same direction at a specific number of revolutions per minute, the output will rotate in the same direction at N r.p.m. The separate ratios in inputs A and B, respectively, to the output are such that:

$$N_o = N_a R_a = N_b R_b$$

where:

$N_o$=speed of output or total angle through which it turns.
$N_a$=speed of input A or total angle through which it turns.
$N_b$=speed of input B or total angle through which it turns.
$R_a$=ratio of input A to output with input B braked to the frame.
$R_b$=ratio of input B to output with input A braked to the frame.

The mechanical converter element or differential capable of the performance required by this invention is available in several forms, two of which are discussed herein. The invention is not, however, limited to the elements described, since other "differential" elements may also be used as converters. This figure will be more fully described at a later point hereunder.

Referring to FIGURE 2, a commercial model of what is commonly called a "1:1 reverse ratio simple differential" is illustrated. This differential is more fully described in Bulletin 309 of Insco Corporation, Groton, Mass., but is illustrated and described herein to enhance clarity of understanding of the specification and to better explain the structure and operation of the invention.

The converter 10 includes a gear carrier generally indicated as 12. The carrier in turn includes a central support or web 14 intermediately dividing an integral semicylindrical portion 16. A pair of annular end plates 18 and 20 which may be integral with or otherwise affixed to the semicylindrical portion 16 are positioned at either of its ends. A shaft having ends 22 and 23 is coaxially positioned through the support 14 and is fixed thereto. Hence, were the shaft to rotate about its axis every portion of the carrier 12 would be caused to rotate with it.

A pair of sun gears 24 and 26 are mounted upon and for rotation about the respective shaft ends 22 and 23 and are restrained against axial movement by appropriate retainers, such as shown at 28.

A pair of planetary gears 30 and 32 are rotatably mounted upon the end plates 18 and 20 and extend therebetween adjacent the carrier peripheries, their axes being parallel to one another and to that of the shaft. The gear teeth of the planetary gear 30 engage those of the sun gear 24 and, beginning at the end nearest the end plate 18, extend more than half the distance between the two end plates. The teeth of the planetary gear 32 similarly extend from the gear end nearest the end plate 20 to engage the teeth of the sun gear 26 and the other planetary gear 30.

It will be readily recognized that when the carrier 12 remains stationary, clockwise rotation of the sun gear 24, viewed from the direction illustrated, causes the planetary gears 30 and 32 to rotate counterclockwise and clockwise, respectively, while the sun gear 26 rotates in a counterclockwise direction. Release of the carrier results in its clockwise rotation. Additionally, it will be appreciated that an input signal may be applied to or an output signal may be received from either of the sun gears in the form of an angular rotation, a velocity, or a torque. Several relationships relative to the various inputs and outputs can be expressed and are significant in the ability of the differential to perform its intended functions, i.e., (1) the torque of the carrier 12 is equal to twice the sum of the torques of the sun gears, at which time system equilibrium is always present, (2) the angular rotation of the carrier is equal to one half the algebraic sum of the angular rotations of the sun gears, or (3) the latter relationship, similarly expressed in terms of angular velocity. Written as an algebraic equation the expression of (2) above is, $$\theta_3 = \frac{\theta_1 + \theta_2}{2}$$

where
$\theta_1$=angular rotation of one sun gear;
$\theta_2$=angular rotation of the other sun gear; and
$\theta_3$=angular rotation of the carrier.

Either of the sun gears may be held stationary while a given signal is applied to the other. Alternatively, signals of different magnitudes may be applied to the two sun gears simultaneously, the output in either event being a function of the quantitative value of the total input signal applied.

When considering the mechanical converter of FIGURE 2 as related to the system of FIGURE 1, if a gear is attached directly to the sun gear 24 (of FIGURE 2) collinear with it, it may be referred to as the input A. If a gear is attached directly to the sun gear 26 collinear with it, it may be referred to as the input B. The shaft 23 is, then, representative of the output "0." If one follows through the principles of operation enumerated above, the device can be demonstrated to satisfy the requirements listed and it may be used as the converter of this invention. In this case $R_a = R_b = 0.5$.

Figure 3:
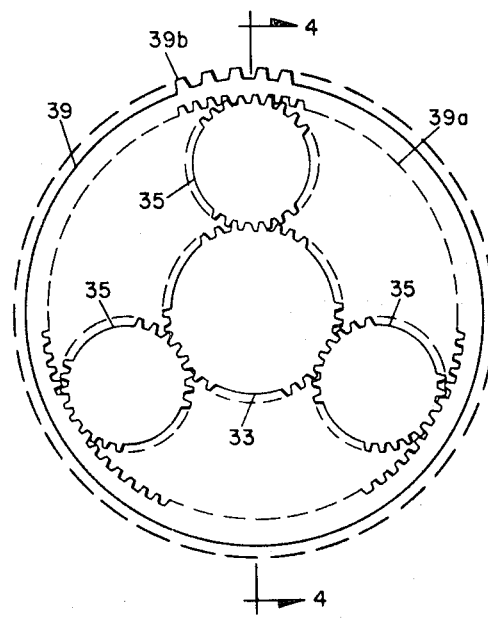
FIGURE 3 is a plan view of an epicyclic planetary gear train usable as the converter of this invention.
Figure 4:
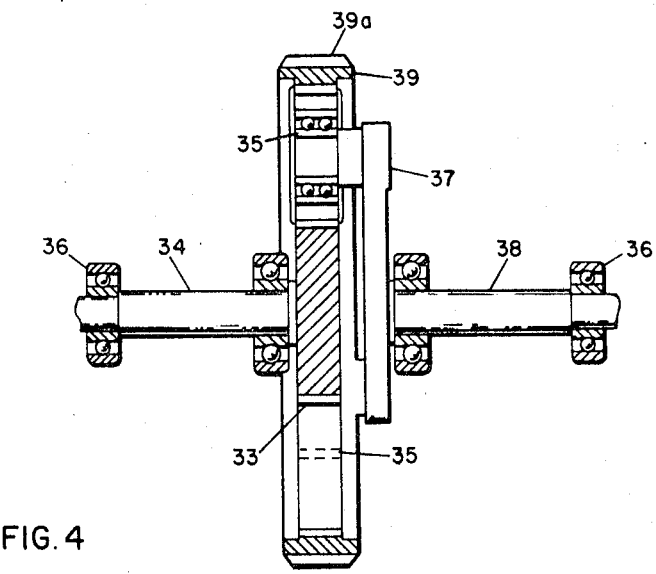
FIGURE 4 is a sectional view taken along line 4—4 of FIGURE 3.

The epicyclic planetary gear train shown in FIGURES 3 and 4 consists of a centrally located sun gear 33 attached to an input shaft 34, the equivalent of input B. Around this gear 33 and meshed with it, are a cluster of planet gears 35 which revolve on suitable bearings 36 supported by an output yoke 37 to which is attached a shaft 38. The shaft 38 may be referred to as output "0." The planet gears also mesh with the internal teeth 39a of a ring gear 39, also supported by a suitable bearing (not shown), and having external gear teeth 39b so that it may be rotated by an external, noncollinear source of power. This is equivalent to input A. When the input is applied to the sun gear 33, the internal gear 39a being held stationary and the output taken from the shaft 38 via the yoke 37, the ratio of output to input speed is:

$$R_a = \frac{1}{2\left(1 + \frac{N_p}{N_s}\right)} \qquad (8)$$

where:

$R_a$=ratio of planet gear yoke output motion to sun gear motion;
$N_p$=number of teeth on the planet gear;
$N_s$=number of teeth on sun gear.

It is apparent that if both the internal gear 39a and the sun gear 33 are turned at the same speed in the same direction the output speed will be equal to the input speed since there is no relative motion between parts of the mechanism. The ratio of the internal gear 39a input motion to output with the sun gear 33 held stationary is then deduced to be:

$$R_b = 1 - \frac{1}{2\left(1 + \frac{N_p}{N_s}\right)} \qquad (9)$$

where:

$R_b$=ratio of planet gear yoke output motion to internal gear motion.

It is also apparent that $R_a$ can never become as small as ½ nor can $R_b$ become as large as ½, for the ratio of planet gear teeth to sun gear teeth can never become zero. A value of $R_b$ of 0.4 is quite practical. This results in an $R_a$ of 0.6. This converter too, may be tested by the criteria set forth for converters usable with this invention and found to be suitable.

With this understanding of typical differentials utilized, a detailed description of that invention follows as described in the "truth table" of FIGURE 5 and as further illustrated in the semischematic representation of FIGURE 6. Concerning the FIGURE 6 system, it will be understood that although a three bit gear train is shown, this representation is for purposes of explanation only. Obviously, any desired number of trains can be used to obtain an infinite number of output values. It should be noted that it is not necessary to place a differential in the last or least significant train since there is only one input required. The only requirement is that there be a 2 to 1 reduction of the input value by a factor of $R_a$. This can be accomplished by the use of conventional spur reduction gears in substantially the manner illustrated.

Figure 7:
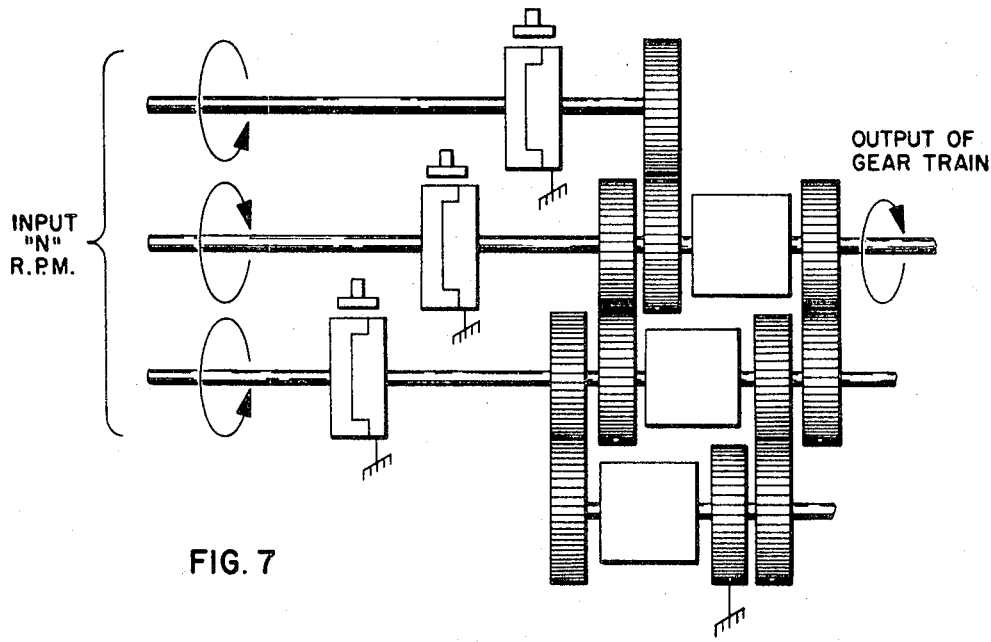
FIGURE 7 is a semischematic illustration of a second embodiment of the invention.
Figures 8, 9:
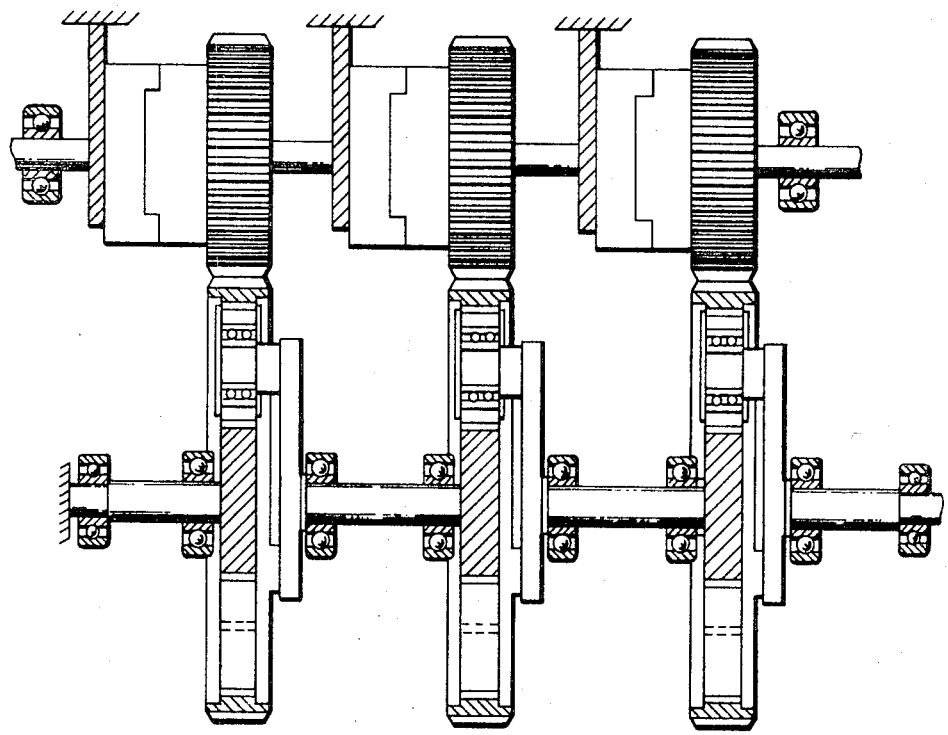
FIGURE 8 is a semischematic illustration of a third embodiment of the invention.
FIGURE 9 is a "truth table" representing possible ratios obtainable with the 3 stage gear train.

Certain basic principles are common to specific adaptations of the invention irrespective of whether the system used is one of the three configurations illustrated in FIGURE 6, 7 or 8, or a comparable system.

The symbolic system representation of FIGURE 1 is suitable for defining these principles. Therein each of the first vertical row of components CB–1, CB–2 and CB–3 represents a combined clutch and brake. Obviously, these components may be better combined or separate, or they may be any other combination of devices which allows the preliminary gear ratio to be either disconnected from the source of rotational power and braked to the frame of the assembly, or to be connected directly to the source of rotation for free rotation with that source. Many combinations of devices which are commercially available could be used for this purpose.

In commanding the clutch brake the term "codes" is used. Code "0" means that the input to a specifically designated converter for producing a preliminary gear ratio is disconnected from the source of rotational power and braked to the frame.

Code "1" means that the input of a specifically designated converter for producing a gear ratio is connected directly to the source of rotational power.

For the purposes of this invention the codes are arranged in order of "significance" so as to compose a binary number, the code of the first stage having the greatest significance. As an example, the code "110" means that the first and second stages are rotating and the third stage is stopped.

The next vertical row of boxes in the illustration of FIGURE 1 symbolically represents the preliminary gear ratio ($R_1$) as inputs ($R_a$) to each of the converters illustrated by the third vertical row of boxes. The first such preliminary gear ratio is 1 and the succeeding inputs may be indicated as $$R_1 = \left(\frac{0.5}{R_b}\right)^{n-1}$$

where $n$ equals the number of the stage, the output being 1, the second stage being 2, etc.

Each of the mechanical converters is capable of summing two mechanical inputs according to the equation:

$$N_o = N_a R_a + N_b R_b \quad (1)$$

as heretofore indicated.

Having once determined these relationships, it can be further stated that the following relationships are also true.

$$O = \frac{NR_a}{0.5}\left(\frac{C_1}{2} + \frac{C_2}{2^2} + \frac{C_3}{2^3} \cdots + \frac{C_n}{2^n}\right) \quad (2)$$

$$R_a + R_b = 1 \quad (3)$$

$$R_i = \left(\frac{0.5}{R_b}\right)^{n-1} \quad (4)$$

$$T_i = \frac{2T_o R_a}{2^n} \quad (5)$$

$$S = 2^x - 1 \quad (6)$$

$$D = \frac{2R_a}{2^x} \quad (7)$$

N=input speed or total rotational angle;
O=output speed or total rotational angle;
$C_1$, $C_2$, $C_3$, etc., are codes which may have the value "0" or "1";
S=total number of available ratios;
$x$=total number of stages;
D=the smallest fractional increment of speed change;
$T_i$=input torque required by a particular stage; and
$T_o$=total torque required by the gear train output.

The "truth table" of FIGURE 5, which is generally representative of those used with this system, shows the binary coding, the input shaft condition and the output speed of the three bit system illustrated in FIGURE 6, wherein "0" indicates clutch engaged, brake disengaged, and "1" indicates clutch disengaged, brake engaged.

For purposes of explanation in the general case a value for $R_a$ of 0.6 and an $R_b$ of 0.4, both of which are practical, realizable values, may be chosen. Using Equation 4, the values of the preliminary gear ratios are calculated to be:

For:

Stage 1, $R_i=1$,
Stage 2, $R_1=1.25$,
Stage 3, $R_1=1.5625$.

In calculating the overall gear train ratios, we may first assume that the code is 001, as shown in line $b$ of the truth table, i.e., that only the third stage is energized. The output O will result from the 1.5625:1 preliminary gear ratio, the 0.6:1 ratio of input $A_3$, the 0.4:1 ratio of input $B_2$, and the 0.4:1 ratio of input $B_1$. The total ratio is:

$$1.5625(0.6)(0.4)(0.4) = 0.15$$

Assuming now that the code, as in row $c$ of the truth table, is 010. The output will result from the 1.25:1 preliminary gear ratio, the 0.6:1 ratio of input $A_2$ and the 0.4:1 ratio of input $B_1$. The total ratio is:

$$1.25(0.6)(0.4) = 0.3$$

Assume the code is 100, as in row $e$ of the truth table. The output will result from the 0.6:1 ratio of input $A_1$ alone. The ratio is:

0.6

Since each of the above output ratios has separate input codes, each containing a single "1," they are found to have a binary relationship. The summing characteristics of the converter, together with the binary relationships provided by separate single codes, combine to provide a separate discrete speed for each code of 000 through 111. The three stage system of FIGURE 6 provides zero plus seven speeds as per Equation 6 above. All combinations may be checked and found to satisfy the equations. The increments of speed available will also be found to follow Equation 7.

The invention is not limited in the number of stages which may be used and it will always follow the equations of section 2a to provide $2^x-1$ speeds in steps $$2R_a/2^x$$

A special case of this invention is when a converter is used with $R_a = R_b = 0.5$. In this case, all preliminary gear ratios are 1:1, resulting in a mechanism which is somewhat simplified.

Adaptation of the invention to a binary coded decimal input code

When an embodiment of this invention has a number of stages divisable by four, the input may be decimally commanded in a very simple manner.

The stages are separated into groups of four, starting at the output. Each group of four is commanded by a 1–2–4–8-binary coded decimal code, so that it represents a decimal digit. The first group of four, including the output stage is the most significant.

The use of the binary coded decimal system suffers the disadvantage of providing fewer ratios for a given number of stages than if the same system were commanded by a straight binary code.

In the FIGURE 6 configuration, three input shafts 40a, 40b, and 40c, respectively, include conventional clutches 42a, 42b and 42c and conventional brakes 44a, 44b and 44c. They also contain drive gears 46a, 46b and 46c, which are adapted to engage and drive gears upon separate components. Alternatively, power may be provided by individual electric braked motors or comparable power means.

A pair of differentials identical to differential 10 of FIGURE 2 are identified as 10a and 10b, the components thereof carrying similar subscripts.

The drive gear 46a is engaged with the input sun gear 24a of the differential 10a and the drive gear 46b similarly engages the input sun gear 24b of the differential 10b.

The first idler gear 48a is mounted to engage and to drive the sun gear 26a of the differential 10a in response to a drive force from the gear 50 which is fixed upon the output shaft of the differential 10b. If desired, the gear 50 may be engaged to drive the sun gear 26a directly. A second idler gear 48b engages the output gear 26b of the differential 10b and the drive gear 46c. The drive gear 46c is sized with respect to the sun gear 26b to provide a gear reduction of 2 to 1.

An output pulley 54 and a belt 56 are representatively illustrated as positioned upon the output shaft 23. It is, of course, apparent that any other appropriate drive receiving means can be used in their places, depending upon the specific application required. It is, nevertheless, intended that this is the only position from which a final or totaled output signal is to be obtained. This output position is sometimes referred to as the primary output of the gear train.

Although the schematic representations of the various shafts do not show mounting for supporting their rotations, it is to be understood that such structural mounts are well known in industrial practice and that, therefore, any conventionally known structural mounts are adaptable for use in the various operational embodiments of the invention.

Utilization of the gear train of this invention provides to the operator the ability to select any desired output-to-input ratio, the selection being capable of accomplishment either prior to or during system operation. This gear train is particularly adaptable for use with an automatic or semiautomatic system for controlling its operation and is inherently capable of a smooth transition from one input-to-output ratio to another such ratio.

Normally, each of the input shafts 40a, 40b and 40c rotates continuously throughout gear train operation. Assuming that the input signals to each of the shafts are equal and in the rotational directions indicated, the output signal at the shaft 23a is varied by actuation or release of the various clutches and brakes. When a particular clutch is engaged, its companion brake is disengaged to permit free rotation of the output gear. Alternatively, clutch disengagement is accompanied by an actuation of the companion brake, causing a complete stoppage of the associated drive shaft and gear. Therefore, whether there is an output resulting from rotation of each input shaft depends upon the status of engagement or disengagement of the clutches and brakes associated with that shaft.

The following are representative examples of operational sequences. For purposes of these examples, each input shaft will be assumed to turn at the rate of one revolution per minute (r.p.m.):

(1) It is axiomatic that when all of the clutches are disengaged (and all brakes are engaged) each of the drive gears is stationary and that there can be no output signal at the output shaft 23a.

(2) Engagement of the clutch 42a and release of the brake 44a results in an input signal of 1 r.p.m. to the input sun gear 24a. If the clutches 42b and 42c are disengaged, the simultaneous engagement of the brakes 44b and 44c prevent the rotation of the input gears 46b and 46c, and the sun gears 24b and 26b (the latter through the retention of gear 46c by the idler gear 48b), thereby effectively preventing any additive input signal from being applied to the sun gear 26a of the differential 10a through the drive gear 50 and the idler gear 48a. Since the carriage portion of the differential 10a is free to rotate responsive to the input signal from the input gear 46a, the result is a rotation of the output shaft 23a at ½ r.p.m. This condition is indicated in row $e$ of the truth table. When all three clutches are engaged, as in row $h$ of the truth table, each of the drive gears 46a, 46b and 46c rotates at 1 r.p.m., as does each of the sun gears 24a and 24b. Since, through the reduction of the speeds of the drive gear 46c and the idler gear 48b to ½ r.p.m., the speed of the sun gear 26b is also reduced to ½ r.p.m., the rotational speed of the carriage of the differential 10b and its associated drive gear 50 are reduced to ¾ r.p.m. As expressed by application of the above-discussed algebraic equation:

$$\frac{1+\frac{1}{2}}{2}=\frac{\frac{3}{2}}{2}=\frac{3}{4} \text{ r.p.m.}$$

This r.p.m. is applied an an input to the sun gear 26a by the idler gear 48a through the drive gear 50 with a further modified result, the ultimate output at the shaft 23a being ⅞ r.p.m. The latter may be expressed by the equation:

$$\frac{1+\frac{3}{4}}{2}=\frac{\frac{7}{4}}{2}=\frac{7}{8} \text{ r.p.m.}$$

Similar calculations can be readily applied for each of the other ratios shown in the truth table of FIGURE 5 to obtain the indicated ratios. A close examination of the 3 bit train will show that the number of gear ratio speeds available at the output of the train, additional to a zero output, can be determined according to the formula:

$$K=2^n-1$$

where $n$ equals the number of stages used in the train, and $K$ equals the number of ratios besides zero, the speed being changed in steps of $½^n$. Hence, in the three state system, $2^3-1$ produces 7 speeds in increments of ⅛ r.p.m. A four stage system produces 15 discrete speeds ($2^4-1=15$). Similarly, a ten stage system provides $2^{10}-1$ or 1023 discrete speeds.

A variation of the invention may be achieved by providing a series of decades. This is accomplished by arranging the stages into groups of four, each group of four stages being designated as a decade. The result of this arrangement is that each decade divides the input revolutions by ten. The basic binary coding method discussed above must then be converted into a binary coded decimal scheme to accommodate this system.

FIGURE 7 shows an embodiment of the invention utilizing simple differentials such as shown in FIGURE 2 as converters to provide seven discrete ratios in steps of ⅛ the input speed. The ratios of gears A and B are equal. Therefore, $$\frac{0.5^{n-1}}{R_b} = 1:1$$

for all stages and the preliminary gear ratios are not required. The gears A and B are respectively representative of or are connected directly to the gears 24 and 26 of the FIGURE 2 differential, while gear O is connected directly to the output shaft of any differential utilized. The clutch brakes function as explained with respect to FIGURE 1. If one follows the same procedure set forth with respect to the truth table explanation for determining the ratios, it will be found that all equations are satisfied. The results of this determination is tabulated in the truth table of FIGURE 9 which shows all possible speed combinations for the three stage system shown in FIGURE 4.

In the design of a practical embodiment of this invention for the transmission of high power it has been found that the usual forms of simple differential have very serious disadvantages when used as a converter. Among these are the limitation of usable power for practical sizes and the inconvenience of the methods required for inserting and withdrawing power. While the simple differential is quite satisfactory for many uses, those applications requiring a more compact high power transmission may be satisfied by the different approach. FIGURE 8 shows an embodiment of the invention in which the asymmetrical or epicyclic differential described above and shown in FIGURES 3 and 4 is combined with other necessary elements. By virtue of the form of the constituent elements, the convenience of the proximity of input and output shafts of the various stages, the present state of gear technology and its overall compactness, this variation of the invention is very advantageous for high power use. In this configuration a common input shaft extends through and continuously drives all clutch brakes. Output gears of the clutch brakes are braked to the frame responsive to an input signal "0," while an input signal "1" connects the output gear of the particular clutch brake to be connected to the input shaft. The gear ratio of clutch brake output to differential input is calculated with Equation 4. If the truth table procedure is followed, using the same values for $R_a$, $R_b$ and $R_i$ as were described with respect to the examples stated in that description, the same ratios will result. The gearing between the clutch brakes and A inputs of the converter in FIGURE 8 represents the preliminary gear ratios. They are not drawn to scale but are to be interpreted as being according to Equation 4. These ratios may also be provided by other transmission means such as Morse toothed chains or roller chains used with appropriate sprockets.

The B input of the last stage of the invention is seen to be connected to the frame in FIGURES 1, 7 and 8, the reason being that this input is not required in the basic operation of the invention. Any gear ratio mechanism having the ratio $R_a$ may be substituted for the converter in the last stage. There are reasons, however, that one may want to use a differential at this position, one reason being that the uniformity of design in the various stages can result in construction economies.

A second reason for utilizing a differential element at this point is to measure the output torque of the gear train with a simple static torque gauge connected between the unoccupied B input and the frame. The output torque will be:

$$T_0 = (R_b)^x T_g \qquad (8)$$

where $T_0$ = gear train output torque,
$T_g$ = torque indicated by gauge,
$x$ = total number of stages.

There is no limit to the number of stages which may be used in this invention. Equation 6 shows that for 10 stages there will be 1023 discrete ratios plus zero. For 15 stages there will be 32,767 discrete ratios plus zero.

The above examples are illustrative of the great utility of this invention. It will be readily recognized that only by fully utilizing the properties of both radix and position can such performance be attained.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A variable binary coded gear train comprising:
   a gear train having at least 4 stages;
   a differential means in all said stages, each said differential having a dual input means and a single output means and wherein the sum of the two respective ratios is always equal to 1 when both inputs are active;
   a drive means operably engaging each said differential means so as to provide separate and equal predetermined inputs thereto;
   a drive means operably connected to drive one of said stages and having an output means connected thereto;
   a clutch connected to each said drive means for activating and deactivating the same;
   a brake connected to each said drive means for preventing rotation thereof when the respective said clutches are disengaged; and
   gear means operatively engaging said output means of each said differential means and said one drive means such that each said differential means is rotatably connected to at least one other said differential means and said one drive means is rotatably connected to one of said differential means.

2. The binary coded gear train of claim 1 wherein each said differential means includes:
   an internally toothed gear carrier mounted for rotation;
   at least one planet gear rotatably mounted in said carrier and meshed therewith; and
   a sun gear intermediate of said planet gears and meshed therewith.

3. The variable binary coded gear train of claim 2 wherein said differential means is an epicyclic planetary gear train, and wherein the first stage is rational with the remainder of the stages being irrational.

4. The variable binary coded gear train of claim 3 wherein said clutch and brake for each said stage are integrated and all said clutches and brakes are mounted upon a common input shaft, and wherein all said differential means are mounted upon a separate common output shaft.

5. The binary coded gear train as set forth in claim 1 wherein:
   first and second ones of said drive means respectively engage first and second ones of said differential means;
   a first said idler means mutually engages said output means of said second differential means and a sun gear of said first differential means; and
   a second said idler means mutually engages said output means of said one drive means and a sun gear of said second differential means.

6. The binary coded gear train as set forth in claim 1 wherein:
   the input-to-output ratio of the last stage is 2 to 1.

7. The binary coded gear train as set forth in claim 1 wherein:
   said stages are connected in series, a first stage including a primary output and a last stage being one without the differential means.

8. The binary coded gear train as set forth in claim 1 wherein:
the number of stages which include differential means is infinitely variable to modify the input-to-output ratio in an infinitely number of increments.

9. The binary coded gear train of claim 1 wherein:
the output of a first stage differential is the primary output and the output of each succeeding differential provides a direct input to the output of the preceding differential.

10. The binary coded gear train of claim 9 wherein:
the gear ratios of all differential input and output gears are equal.

References Cited
UNITED STATES PATENTS

| | | | |
|---|---|---|---|
| 2,521,771 | 9/1950 | Bechle | 74—681 |
| 2,908,188 | 10/1959 | Maybarduk | 74—681 X |
| 2,919,605 | 1/1960 | Maybarduk | 74—681 |
| 2,972,905 | 2/1961 | Bullard | 74—681 |

FOREIGN PATENTS

| | | |
|---|---|---|
| 540,565 | 12/1931 | Germany. |
| 1,114,505 | 12/1955 | France. |

ARTHUR T. McKEON, Primary Examiner